United States Patent
Freeman et al.

(10) Patent No.: US 8,165,947 B1
(45) Date of Patent: Apr. 24, 2012

(54) SYSTEM AND METHOD FOR ELECTRONIC TRADING

(75) Inventors: Ivan K. Freeman, New York, NY (US); Marc P. Rosenthal, Passaic, NJ (US); Sapna C. Patel, New York, NY (US)

(73) Assignee: Morgan Stanley, New York, NY (US)

( * ) Notice: Subject to any disclaimer, the term of this patent is extended or adjusted under 35 U.S.C. 154(b) by 733 days.

(21) Appl. No.: 12/184,364

(22) Filed: Aug. 1, 2008

(51) Int. Cl.
*G06Q 40/00* (2006.01)

(52) U.S. Cl. .................................................. 705/36 R

(58) Field of Classification Search ............... 705/35–37
See application file for complete search history.

(56) References Cited

U.S. PATENT DOCUMENTS

| | | | | |
|---|---|---|---|---|
| 7,711,640 | B2 * | 5/2010 | Claus et al. ..................... | 705/39 |
| 2004/0143538 | A1 * | 7/2004 | Korhammer et al. ............ | 705/37 |
| 2005/0240510 | A1 * | 10/2005 | Schweickert et al. .......... | 705/37 |
| 2007/0100734 | A1 * | 5/2007 | Berger et al. .................... | 705/37 |
| 2008/0228622 | A1 * | 9/2008 | Adcock et al. .................. | 705/37 |
| 2009/0070250 | A1 * | 3/2009 | Adcock et al. .................. | 705/37 |
| 2009/0076961 | A1 * | 3/2009 | Waelbroeck et al. ........... | 705/50 |
| 2009/0210337 | A1 * | 8/2009 | Mahoney et al. ................ | 705/37 |

OTHER PUBLICATIONS

Mehta, Nina. "Darkness at High Noon." Traders Magazine Jan. 1, 2007 (6 pages).*

Mehta, Nina. "It's Gray Out There." Traders Magazine. New York: Jun. 1, 2008 (8 pages).*

* cited by examiner

*Primary Examiner* — Elda Milef

(74) *Attorney, Agent, or Firm* — K&L Gates LLP

(57) ABSTRACT

The systems and methods relate to a new securities order type—the MON Order—which remains undisplayed and does not become executable until a minimum trigger quantity is reached, thereby making such order executable. The MON Order includes information that indicates a symbol of the security, the number of shares of the security to buy/sell, the side of the order and a trigger quantity. For limit orders, the order also includes a limit price. The MON Order may be received by an initial trading center that may determine whether the trigger quantity is satisfied based on the available number of shares for the security in the marketplace, where the available number of shares is based on the aggregate of (i) the displayed and undisplayed liquidity for the security at the initial trading center, and (ii) the displayed accessible liquidity at one or more away trading centers that is known to the initial trading center. When the available number of shares is equal to or greater than the trigger quantity, the initial trading center may (i) execute the MON Order against the shares available on the initial trading center's book, and (ii) send additional orders (such as ISOs marked IOC, if appropriate) for the security to the one or more away trading centers to execute against their respective accessible liquidity, as necessary.

45 Claims, 2 Drawing Sheets

SYSTEM AND METHOD FOR ELECTRONIC TRADING

BACKGROUND

1. Field of the Invention

Figure 1:
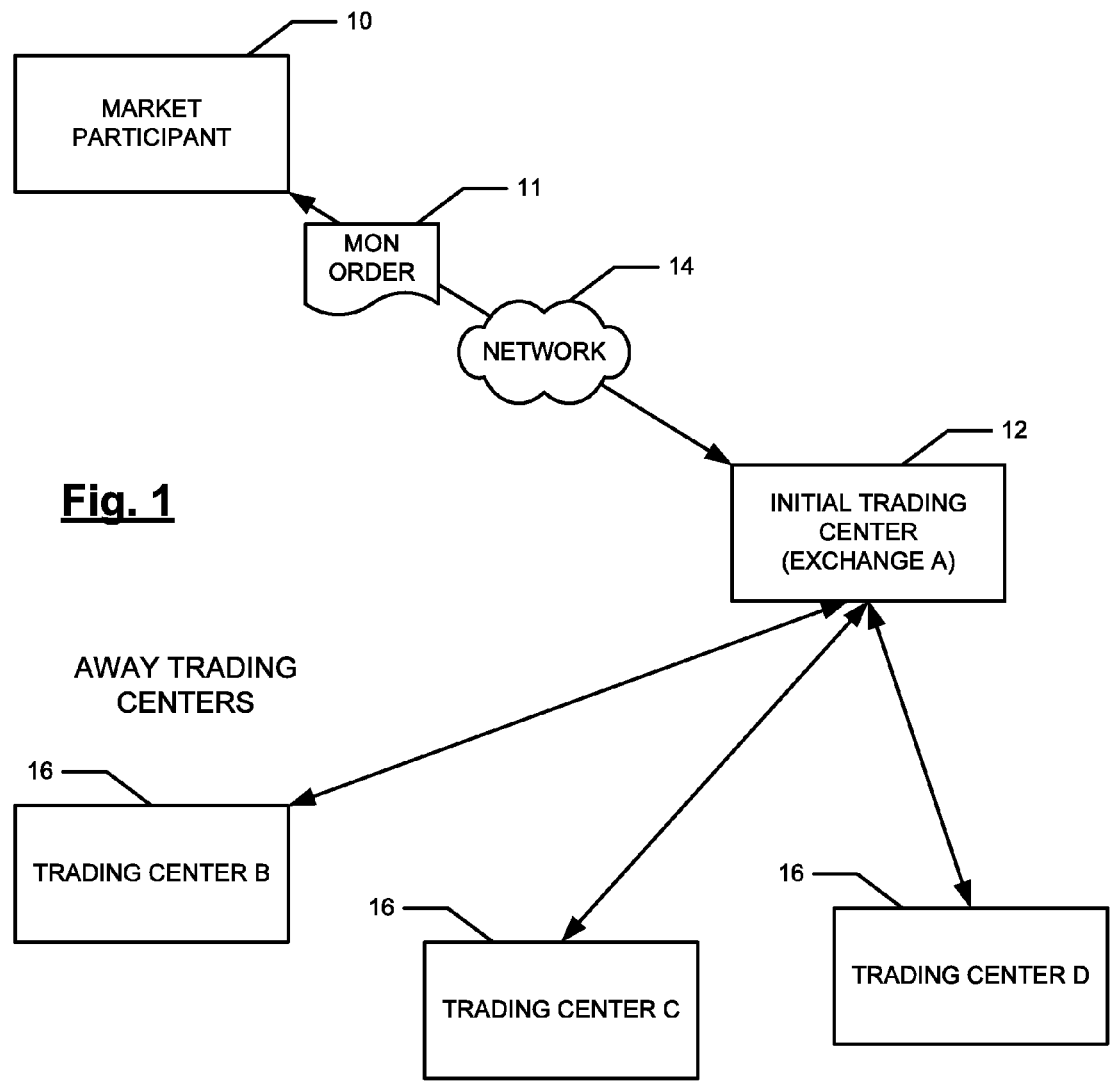

The present invention generally involves a new order type for the trading of financial securities products (e.g., equity shares of stock in a company or corporation).

2. Description of the Background

In the United States, securities are generally traded on national securities exchanges or over-the-counter (e.g., on alternative trading systems ("ATSs"), including electronic communication networks ("ECNs"), and/or internally by broker-dealers). These trading centers may be floor-based or manual (e.g., an exchange trading floor with specialists and/or market-makers), electronic (e.g., an automated trading system that matches buy and sell orders) or a hybrid of both (e.g., an exchange that has a physical trading floor and an automated system that matches orders).

Orders to buy/sell securities are typically market orders or limit orders that indicate, among other things, the name/symbol of security to be bought/sold, the number of shares (i.e., order size) and possibly a maximum purchase/sale price (i.e., limit price) (solely in the case of limit orders), which may require a trading center to publicly display such orders.

Market participants (e.g., exchanges, ATSs/ECNs, broker-dealers and/or clients of broker-dealers (in some instances)) may send buy/sell orders to a trading center to be matched with sell/buy orders in a particular security or securities and receive one or more executions. Based on the terms of an order, a trading center receiving the order may be required to publicly display such order before it can receive an execution. The display of its order would alert the general public to the market participant's willingness to buy/sell a certain number of shares of a particular security at a specific price and could potentially convey the market participant's trading strategy and/or cause the market for the security to move drastically depending on the size and price of the order. In these types of cases, it may be disadvantageous for a market participant to have its order displayed in this manner.

SUMMARY

The present invention generally involves a new securities order type, referred to as the Minimum-or-None Order ("MON Order"), which remains undisplayed and does not become executable until a trigger quantity is satisfied. The MON Order includes information that indicates, among other things: (i) the name, symbol or other identifier of a security that is the subject of the order; (ii) whether the order is an order to buy or sell the security (i.e., the side of the order); (iii) the number of shares to be bought or sold (i.e., order size or quantity); and (iv) a "trigger quantity" (i.e., a minimum number of available shares that would make the order executable). The MON Order may also indicate a limit price if the MON Order is a limit order. If the MON Order is a market order, the order could be immediately executed at the market price if the trigger quantity is reached.

An initial trading center may receive the MON Order from a market participant. When the initial trading center receives the MON Order, the initial trading center may not display the order and may determine whether the trigger quantity of the order has been satisfied based on the available number of shares for the security that the initial trading center can "see" on its own book and/or at away trading centers. The available number of shares may comprise the aggregate of the (i) the displayed shares (i.e., displayed or visible liquidity) and the undisplayed shares (i.e., reserve or hidden liquidity) for the security at the initial trading center, and (ii) the displayed accessible liquidity at any away trading centers. The initial trading center may compare the available number of shares to the trigger quantity, and when the available number of shares in the marketplace is equal to or greater than the trigger quantity, the initial trading center may (i) execute the MON Order against the available shares on its book (both displayed and undisplayed/reserve liquidity), and (ii) send additional orders (such as Intermarket Sweep Orders ("ISOs"), as such term is defined in Regulation NMS of the Securities Exchange Act of 1934, marked "immediate-or-cancel" ("IOC"), if appropriate) to away trading center(s) that are displaying accessible shares for the security, as necessary. Consequently, the MON Order only becomes executable when the minimum trigger quantity is reached based on the available accessible liquidity in the marketplace.

The trigger quantity is not a minimum fill quantity requirement, so there is no guarantee that the number of shares actually bought/sold will equal the trigger quantity that made the MON Order executable. The present invention may, therefore, allow a market participant to send to a trading center a relatively large order that would remain undisplayed until a trigger quantity indicated on the order is reached, thereby making such order executable at such time.

Depending on the trading strategy that a market participant wishes to use, the trigger quantity may be less than, equal to or greater than the entire order size. When the trigger quantity is greater than the order size, there would be a greater likelihood that the full MON Order will be executed because there is more than sufficient liquidity for that security available in the marketplace. When the trigger quantity is less than the order size, only a portion of the MON Order may be executed, and the trigger quantity may then automatically update to the minimum number of shares necessary to make the remainder of the MON Order executable. This trigger quantity update process may repeat until the entire MON Order is executed, expires or is otherwise withdrawn or cancelled by the market participant.

FIGURES

Figure 2:
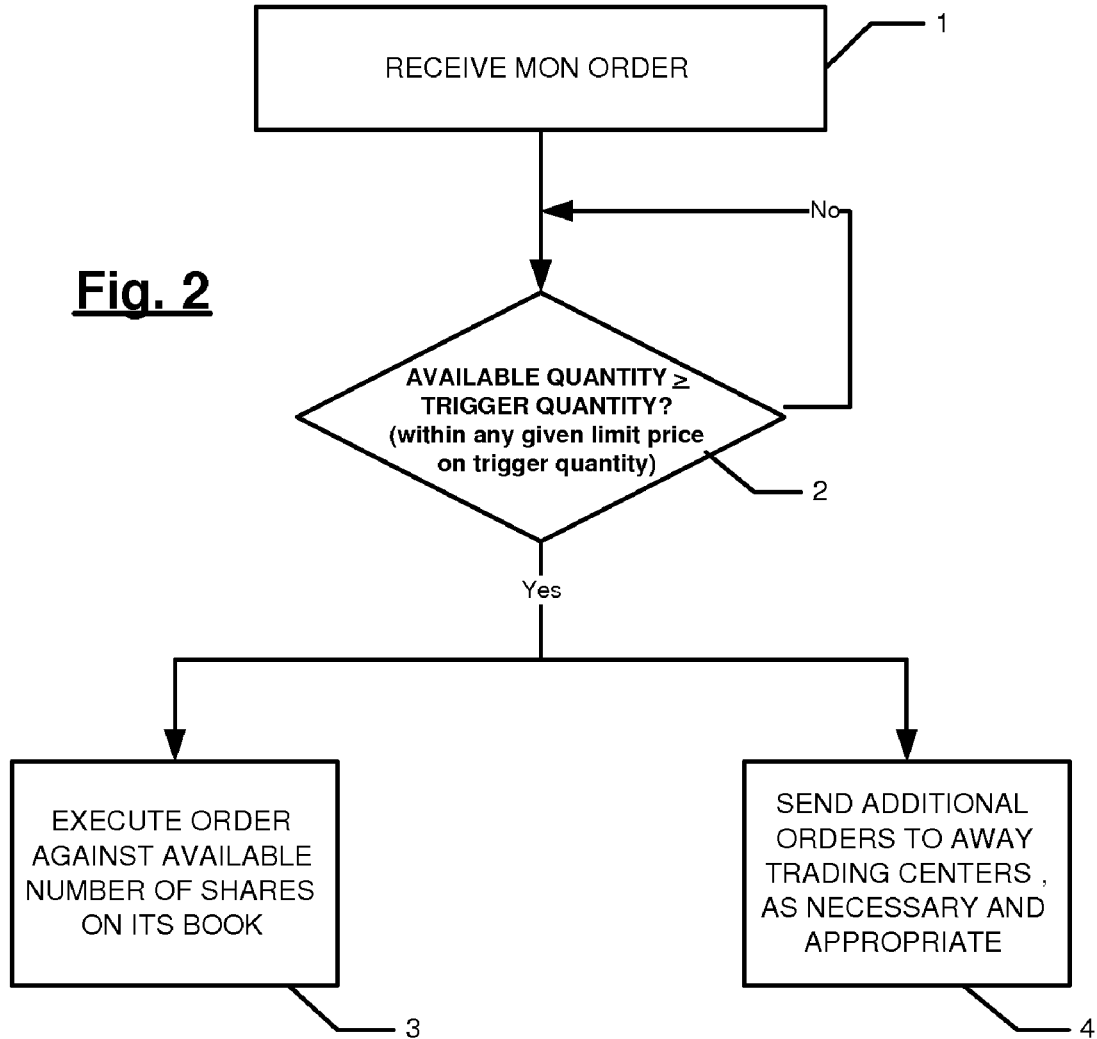

The use of the present invention and various embodiments of the present invention are described herein by way of example in conjunction with the following figures wherein:

FIG. 1 is a diagram of a system illustrating the use and various embodiments of the present invention; and FIG. 2 is a diagram of a process illustrating the use and various embodiments of the present invention.

DETAILED DESCRIPTION

The present invention generally involves a new financial securities order type, the Minimum-or-None Order ("MON Order"), which does not become executable until a minimum trigger quantity is reached. The MON Order may be a market or limit order to buy or sell a particular number of shares of a security/stock, subject to the constraints that the order remain undisplayed and does not become executable until such time that the available number of shares at trading centers in the marketplace meets or exceeds a minimum threshold (or trigger) quantity indicated on the MON Order. The "marketplace" in this context may be any trading center (e.g., national securities exchanges (such as the New York Stock Exchange and The NASDAQ Stock Market) and ATSs/ECNs) that matches buy and sell orders for securities. The "available number of shares" in the marketplace means the sum of known and accessible displayed, as well as undisplayed, liquidity in the marketplace.

With reference to FIG. 1, a market participant 10 may send the MON Order 11 to an initial trading center 12, such as an exchange or ATS/ECN. In the example of FIG. 1, the market participant 10 sends the MON Order to Exchange A. The market participant's order may be for a client of the broker-dealer, for another broker-dealer or for the broker-dealer itself; the market participant may also be a client of a broker-dealer who sends an order on behalf of itself in such broker-dealer's name (e.g., electronic trading or self-trading clients, as such terms are commonly known and used in the securities industry). The MON Order may be sent via a network 14, which may have direct connectivity to the initial trading center 12 or indirect connectivity through a service bureau, an order router or another trading center to the initial trading center 12. Exchange A may have displayed and undisplayed/reserve liquidity in various securities on its book. Exchange A may also have information regarding the displayed accessible liquidity at away trading centers 16, which may include exchanges and/or ATSs/ECNs. In FIG. 1, only three away trading centers 16 are shown (Trading Centers B-D), although it should be recognized that in implementation the initial trading center 12 may be connected to more or fewer away trading centers 16, as necessary or required.

The MON Order may be sent by a market participant electronically or via telephone or any other suitable means. In the case of an electronic order, the MON order may include various information/data within data fields in accordance with a specified data format. The trading centers 12 and 16 may be floor-based, automated and/or hybrid exchanges and/or ATSs/ECNs (and/or dark liquidity trading systems based on various embodiments) that match buyers and sellers of securities and that have the ability to send additional orders (such as ISOs marked IOC, if appropriate) to other trading centers, as necessary, as is known in the art. Among other things, the initial trading center 12 may (i) receive MON Orders from market participants, (ii) monitor the liquidity on its book and at away trading centers and compare the available liquidity to the trigger quantity to determine if the trigger quantity is reached and (iii) attempt to execute the MON Order when the trigger quantity is reached, including executing the MON Order against the available shares on its book (both displayed and undisplayed/reserve liquidity) and sending orders to certain away trading centers, if necessary.

The market participant 10 may be a human being (e.g., a broker-dealer or client of a broker-dealer (in some cases)) or a computerized trading system that sends an order to the initial trading center 12 on behalf of the market participant, such as via the network 14. In various embodiments, trading centers 12 and 16 may comprise electronic, computer-based trading systems that facilitate the trading of financial security products. Trading center 12 may comprise one or a number of networked computer devices (e.g., servers, mainframes and/or processors), which may be programmed to carry out the processes described herein. According to various embodiments, trading center 12 may comprise a centralized or distributed network of servers or other computer devices acting together as an electronic/automated trading center.

Among other things, the MON Order may include information (e.g., data in an electronic format) indicating: (i) the name, symbol or other identifier of the security to be traded; (ii) the side of the order (.e.g., whether it is a buy order or a sell order); (iii) the order size (e.g., the number of shares); (iv) a minimum trigger quantity and (v) possibly a limit price if the order is a limit order. If the order is a market order, a limit price is not included. The trigger quantity indicates the minimum number of available shares of the security that the initial trading center, Exchange A in this example, knows to be accessible in the marketplace before the MON Order can become executable. The information on the MON Order indicating the trigger quantity may be, for example, (i) the actual number of shares that corresponds to the trigger quantity, or (ii) the number of shares that corresponds to the trigger quantity derived by using, for example, a formula or similar calculation method.

The available number of shares in the marketplace may comprise the displayed and undisplayed/reserve liquidity on Exchange A, as well as any displayed accessible liquidity at away trading centers 16 for which Exchange A has such information. Accordingly, the initial trading center 12 may monitor its own book (that is, its own order information, which may be maintained in electronic trading systems of the initial trading center 12 in various embodiments) to determine the available number of shares at its own trading center, as well as monitor information regarding the available number of shares at the away trading centers 16. The initial trading center 12 may receive information (e.g., data) regarding the availability of shares at the away trading centers 16 directly or indirectly (such as through a third party) from the away trading centers 16.

The order size specifies the total number of shares of the security that the market participant wants to buy/sell, and may be less than, equal to or greater than the trigger quantity. Once the trigger quantity is reached, the MON Order becomes executable, in which case the initial trading center receiving the order (Exchange A in this example) may execute it against the available shares on its book and may send additional order(s) (such as ISOs marked IOC, if appropriate) to the away trading centers 16 to access their respective displayed liquidity, as necessary.

Consider an example where a market participant wants to sell 60,000 shares of XYZ stock with a limit price of $29.98 and with a minimum trigger quantity of 30,000 shares. That is, the market participant desires to sell 60,000 shares of XYZ stock down to the limit price of $29.98, but subject to the constraint that there are at least 30,000 shares available and accessible at the initial trading center and the away trading centers (subject to any restrictions on the away trading centers, discussed below). The market participant 10 sends the MON Order 11 to an initial trading center 12 (e.g., Exchange A). Assume that at the time that Exchange A receives the MON Order, the bids in the marketplace known to Exchange A for security XYZ and satisfying the specified limit price are as follows:

| Bid Price ($) | Trading Center | Displayed | Undisplayed/Reserve |
|---|---|---|---|
| 30.00 | Exchange A | 1,000 | 21,000 |
| 29.99 | Trading Center B | 400 | — |
| 29.99 | Trading Center C | 200 | — |

In this example, the MON Order would remain undisplayed by the initial trading center and would not become executable because the available number of shares known to Exchange A is 22,600 shares, which is less than the 30,000 minimum trigger quantity.

Now suppose that the available number of shares known to Exchange A for security XYZ and satisfying the specified limit price is as follows:

| Bid Price ($) | Trading Center | Displayed | Undisplayed/ Reserve |
| --- | --- | --- | --- |
| 30.00 | Exchange A | 1,000 | 21,000 |
| 29.99 | Trading Center B | 400 | — |
| 29.99 | Trading Center C | 200 | — |
| 29.98 | Exchange A | 400 | 7,000 |

In this case, the available number of shares is equal to the trigger quantity (30,000 shares in this example), in which case the MON Order becomes executable. Upon triggering, Exchange A may execute 29,400 shares against its book and may simultaneously send additional orders (such as ISOs marked IOC, if appropriate) to Trading Centers B and C to execute against their respective displayed quantities at $29.99. There is no guarantee that any or all executions would occur at these trading centers. The trigger quantity may then be updated to 30,000 shares for the remainder of the MON Order.

The following is an example for a buy order. Suppose a market participant wants to buy 60,000 shares of XYZ security up to a limit price of $30.00 and the trigger quantity is 30,000 shares. Suppose that the MON Order is sent to Exchange A and that the available number of shares known to Exchange A for security XYZ and satisfying the specified limit price is as follows:

| Offer Price ($) | Trading Center | Displayed | Undisplayed/ Reserve |
| --- | --- | --- | --- |
| 30.00 | Exchange A | 1,000 | 21,000 |
| 29.99 | Trading Center B | 400 | — |
| 29.99 | Trading Center C | 200 | — |

In this case, the MON Order would remain undisplayed by the initial trading center and would not be triggered because the available number of shares is not equal to or greater than the trigger quantity (30,000 shares in this example). Suppose, however, that the available number of shares known to Exchange A and satisfying the specified limit price is as follows:

| Offer Price ($) | Trading Center | Displayed | Undisplayed/ Reserve |
| --- | --- | --- | --- |
| 30.00 | Exchange A | 1,000 | 21,000 |
| 29.99 | Trading Center B | 400 | — |
| 29.99 | Trading Center C | 200 | — |
| 29.98 | Exchange A | 400 | 7,000 |

In this case, the available number of shares known to Exchange A is equal to the trigger quantity, in which case the MON Order is triggered. Exchange A may execute 29,400 shares against its book and may simultaneously send additional orders (such as ISOs marked IOC, if appropriate) to Trading Centers B and C to execute against their displayed accessible liquidity at $29.99. There is no guarantee that any or all executions would occur at these trading centers. The trigger quantity may then be updated to 30,000 shares for the remainder of the MON Order.

There may be no guarantee that the full trigger quantity of shares (30,000 shares in the above examples) is executed because the MON Order sent to the initial trading center (e.g., Exchange A) and any additional orders sent to the away trading centers (e.g., Trading Centers A and B) may not be executed. The shares that were available at a particular quotation price may no longer be available when the orders attempt to access such quotations at these trading centers. The lack of executions/fills is not problematic, however, because the trigger quantity is not equivalent to a minimum fill quantity. In certain embodiments, the trigger quantity would then be updated for any remainder of the MON Order, and the remainder of the MON Order would continue to remain undisplayed until the trigger quantity is again satisfied. It should also be noted, as mentioned above, that the trigger quantity could be less than, equal to or greater than the actual order size.

As can be seen in the above examples, according to the various uses and embodiments of the present invention, using the new order type described above, where the MON Order includes a trigger quantity such that the order does not become executable until the available number of shares in the overall market meets or exceeds the trigger quantity, would allow market participants to send an order that is not displayed to the general public while it waits to become executable. Even then, any quantity of the MON Order greater than the trigger quantity would continue to remain undisplayed. Some market participants may prefer such an order type so that their order does not convey their trading strategy and/or have an excessive impact on the market.

FIG. 2 is a diagram of a process followed by the initial trading center 12 according to various embodiments of the present invention. At step 1, the initial trading center 12 receives the MON Order 11. As described above, the MON Order 11 may specify, among other things, the symbol of the security that is the subject of the order, the side of the order, the number of shares of the security to buy/sell, a minimum trigger quantity and possibly a limit price. At step 2, the initial trading center 12 may determine whether the available number of shares for the security is equal to or greater than the trigger quantity, where the available number of shares may include (i) the displayed and undisplayed/reserve liquidity for the security at the initial trading center 12, and (ii) any displayed accessible liquidity at the away trading centers 16 for which the initial trading center 12 has such information. The initial trading center 12 may continually monitor the available number of shares to determine whether the applicable trigger quantity has been met until the MON Order is executed or until it has expired, is cancelled or is withdrawn. If the trigger quantity is met, as discussed above, the initial trading center 12 may simultaneously execute the MON Order against the available liquidity on its book (step 3) and may send additional orders (such as ISOs marked IOC, if appropriate) to the away trading centers 16 (step 4), as necessary. With reference to FIG. 1, the initial trading center 12 may send additional orders (such as ISOs marked IOC, if appropriate) to all three of the away trading centers 16. It should be recognized that in other embodiments, the initial trading center 12 may send orders to more or fewer away trading centers, as required.

In various embodiments, an away trading center 16 to which the initial trading center 12 may send a MON Order 11 when the trigger quantity is reached may be a "dark liquidity trading system" (e.g., an ATS or other broker-dealer operated system or process that does not publicly display quotations, but may provide certain information regarding the orders that it could match, including, among other things, symbol, side, price and/or quantity, to various trading centers and market participants in the form of "indications of interest", as such term is commonly known and used in the securities industry, or in some other manner). For example, a dark liquidity trading system could possibly receive the MON Order 11 first and then send it to another trading center for handling and execution with such information regarding its own available liquidity. If the initial trading center 12 has access to such price and quantity information for securities at a dark liquidity trading system, it may include this liquidity into its determination of "available number of shares" for purposes of ascertaining whether the trigger quantity of the MON Order 11 has been met. Under these circumstances, the initial trading center 12 may send an additional order to the dark liquidity trading system (also an away trading center 16), in addition to any other away trading centers 16, to access such available liquidity, as necessary and in an appropriate manner.

In various embodiments, once the initial trading center 12 has determined that there may be available liquidity to meet much of the trigger quantity, it may decide, based on its past trading experience with certain venues, to "ping" away trading centers 16 that are dark liquidity trading systems with orders, such as all-or-none orders (i.e., orders that must be executed in full by a receiving trading center or otherwise be cancelled back immediately) or IOC orders, in order to immediately acquire the remaining number of shares to reach the trigger quantity of a MON Order 11, thereby making it executable. In this case, if the initial trading center 12 is able to immediately acquire additional undisplayed liquidity from dark liquidity trading systems to meet the trigger quantity, such liquidity could be used by the initial trading center 12 in its calculation of "available number of shares" to trigger the MON Order 11.

In various embodiments, a MON Order 11 could be designated with another limit price related to the available number of shares for the trigger quantity portion of the order, in addition to a limit price that may be designated on the MON Order 11. Such limit price for the trigger quantity (the "trigger quantity limit price") of the MON Order 11 could be equal to or greater or less than the limit price of the order. For example, a market participant may send a MON Order 11 to buy 100,000 shares of XYZ stock up to a limit price of $50.10 with a trigger quantity of 50,000 shares. The market participant may also designate on its MON Order 11 that the order only be triggered if there are 50,000 shares available at the trigger quantity limit price of $50.08, thereby indicating that the market participant sending the MON Order 11 may be willing to pay more based on the number of shares available to trigger its order. Similarly, in the example above, the market participant may instead designate on the MON Order that its order only be triggered if 200,000 shares are available in the marketplace at a trigger quantity limit price of 50.12.

In various embodiments, the market participant 10 sending the MON Order 11 may indicate certain restrictions on the order. For instance, the market participant 10 may restrict consideration of the availability of liquidity at various away trading centers 16 by the initial trading center 12 for purposes of ascertaining whether the minimum trigger quantity has been satisfied. Additionally, the market participant sending the MON Order 11 may restrict routing to such away trading centers 16. These features of the MON Order together enable the market participant 10 to avoid away trading centers 16 that it does not wish to trade with. For example, the MON Order 11 could specify that orders to away trading centers 16 are only to be sent to certain, specified away trading centers, or that they are to be sent to all away trading centers 16 except for certain, specified ones.

These two restriction features could also be used separately. For example, the market participant 10 could also solely restrict routing by the initial trading center 12 to certain away trading centers 16, while still considering the liquidity at such trading centers for purposes of determining whether the trigger quantity has been met. For example, with reference to FIG. 1, the initial trading center may monitor availability information from Trading Centers B, C and D for purposes of determining the available number of shares, but only send orders to Trading Centers B and C. Similarly, the market participant 10 could solely restrict the consideration of available shares at various away trading centers 16 by the initial trading center 12, but may still permit its MON Order (or a portion thereof) to be routed to such excluded trading centers if the trigger quantity is met upon the initial trading center 12's view of the available number of shares at non-restricted away trading centers 16. For example, the initial trading center may only monitor the availability data from Trading Centers B and C, but send orders to Trading Centers B, C and D. The ability to use one or both restriction features on its MON Order allows the market participant 10 more flexibility and control in the handling on its order.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

The processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent and/or semitemporary.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations, and adaptations without departing from the scope and spirit of the present invention as defined by the appended claims.

What is claimed is:

1. A method comprising:
   receiving, by at least one computer of an initial trading center for trading securities, an order to buy or sell a security, wherein the order includes information indicating (i) a symbol of the security, (ii) a side of the order, (iii) an order size indicating the number of shares of the security to buy/sell and (iv) a trigger quantity, wherein the trigger quantity is not a minimum fill quantity constraint, and wherein the order remains unexecutable until the trigger quantity is satisfied; and
   determining, by the at least one computer of the initial trading center, whether the trigger quantity is satisfied based on an available number of shares for the security, wherein the available number of shares is based on the aggregate of (i) the displayed and undisplayed/reserve liquidity for the Security at the initial trading center, and (ii) the displayed accessible liquidity at one or more away trading centers that is known to the initial trading center.

2. The method of claim 1, further comprising the steps of, upon determining that the order is executable based on the trigger quantity being satisfied:

executing, by the initial trading center, the order against the shares available on the initial trading center's book; and sending, by the initial trading center, one or more additional orders for the security to one or more of the away trading centers.

3. The method of claim 2, wherein the order is executable when the available number of shares is equal to or greater than the trigger quantity.

4. The method of claim 1, wherein the trigger quantity is less than the order size.

5. The method of claim 1, wherein the trigger quantity is greater than the order size.

6. The method of claim 1, wherein the trigger quantity is equal to the order size.

7. The method of claim 1, wherein the order remains undisplayed by the initial trading center until the trigger quantity is reached.

8. The method of claim 1, wherein the initial trading center is a national securities exchange.

9. The method of claim 1, wherein the initial trading center is an ATS/ECN.

10. The method of claim 1, wherein the one or more away trading centers comprise one or more national securities exchanges.

11. The method of claim 1, wherein the one or more away trading centers comprise one or more ATSs/ECNs.

12. The method of claim 1, wherein the one or more away trading centers comprise one or more dark liquidity trading systems.

13. The method of claim 1, wherein the available number of shares to reach the trigger quantity includes both displayed and undisplayed/reserve liquidity.

14. The method of claim 2, further comprising updating the trigger quantity for a remainder of the order.

15. The method of claim 1, wherein the order is a buy order.

16. The method of claim 1, wherein the order is a sell order.

17. The method of claim 1, wherein the order is a market order.

18. The method of claim 1, wherein the order is a limit order and the order includes a limit price.

19. The method of claim 18, wherein the order includes a trigger quantity limit price that is different from the limit price.

20. The method of claim 1, wherein the order comprises an electronic order.

21. The method of claim 1, wherein the order includes a restriction on the available number of shares at certain away trading centers that may be considered by the initial trading center for purposes of determining whether the trigger quantity is met.

22. The method of claim 2, wherein the order includes a restriction regarding the away trading centers that the initial trading center may route to.

23. A trading system comprising:

an initial trading center that that comprises at least one computer for trading securities that is programmed to:

receive an order to buy or sell a security, wherein the order includes information indicating (i) a symbol of the security, (ii) a side of the order, (iii) an order size indicating the number of shares of the security to buy/sell and (iv) a trigger quantity, wherein the trigger quantity is not a minimum fill quantity constraint, and wherein the order remains unexecutable until the trigger quantity is satisfied; and determine whether the trigger quantity is satisfied based on the available number of shares for the security, wherein the available number of shares is based on the aggregate of (i) the displayed and undisplayed/reserve liquidity for the security at the initial trading center, and (ii) the displayed accessible liquidity at one or more away trading centers that is known to the initial trading center.

24. The trading system of claim 23, wherein, upon determining that the order is executable based on the trigger quantity being satisfied, the initial trading center:

executes the order against the shares available on the initial trading center's book; and sends one or more additional orders for the security to one or more of the away trading centers.

25. The trading system of claim 24, wherein the order is executable when the available number of shares is equal to or greater than the trigger quantity.

26. The trading system of claim 23, wherein the trigger quantity is less than the order size.

27. The trading system of claim 23, wherein the trigger quantity is greater than the order size.

28. The trading system of claim 23, wherein the trigger quantity is equal to the order size.

29. The trading system of claim 23, wherein the order remains undisplayed by the initial trading center until the trigger quantity is reached.

30. The trading system of claim 23, wherein the initial trading center is a national securities exchange.

31. The trading system of claim 23, wherein the initial trading center is an ATS/ECN.

32. The trading system of claim 23; wherein the one or more away trading centers comprise one or more national securities exchanges.

33. The trading system of claim 23, wherein the one or more away trading centers comprise one or more ATSs/ECNs.

34. The trading system of claim 23, wherein the one or more away trading centers comprise one or more dark liquidity trading systems.

35. The trading system of claim 23, wherein the available number of shares to reach the trigger quantity includes both displayed and undisplayed/reserve liquidity.

36. The trading system of claim 24, further comprising updating the trigger quantity for a remainder of the order.

37. The trading system of claim 23, wherein the order is a buy order.

38. The trading system of claim 23, wherein the order is a sell order.

39. The trading system of claim 23, wherein the order is a market order.

40. The trading system of claim 23, wherein the order is a limit order and specifies a limit price.

41. The system of claim 40, wherein the order indicates a trigger quantity limit price that is different from the limit price.

42. The trading system of claim 25, wherein the order comprises an electronic order.

43. The trading system of claim 23, wherein the includes a restriction on the available number of shares at certain away trading centers that may be considered by the initial trading center for purposes of determining whether the trigger quantity is met.

44. The trading system of claim 24, wherein the order includes a restriction regarding the away trading centers that the initial trading center may route to.

45. The trading system of claim 23, wherein the initial trading center comprises one or more servers programmed to:

determine whether the trigger quantity is satisfied; and when the trigger quantity is satisfied, (i) execute the order against the shares available on the initial trading center's book, and (ii) send the one or more additional orders for the security to the one or more of the away trading centers.

* * * * *